J. EASTERLY.
Base Burning Stove.
No. 3.010.
Reissued June 30, 1868.
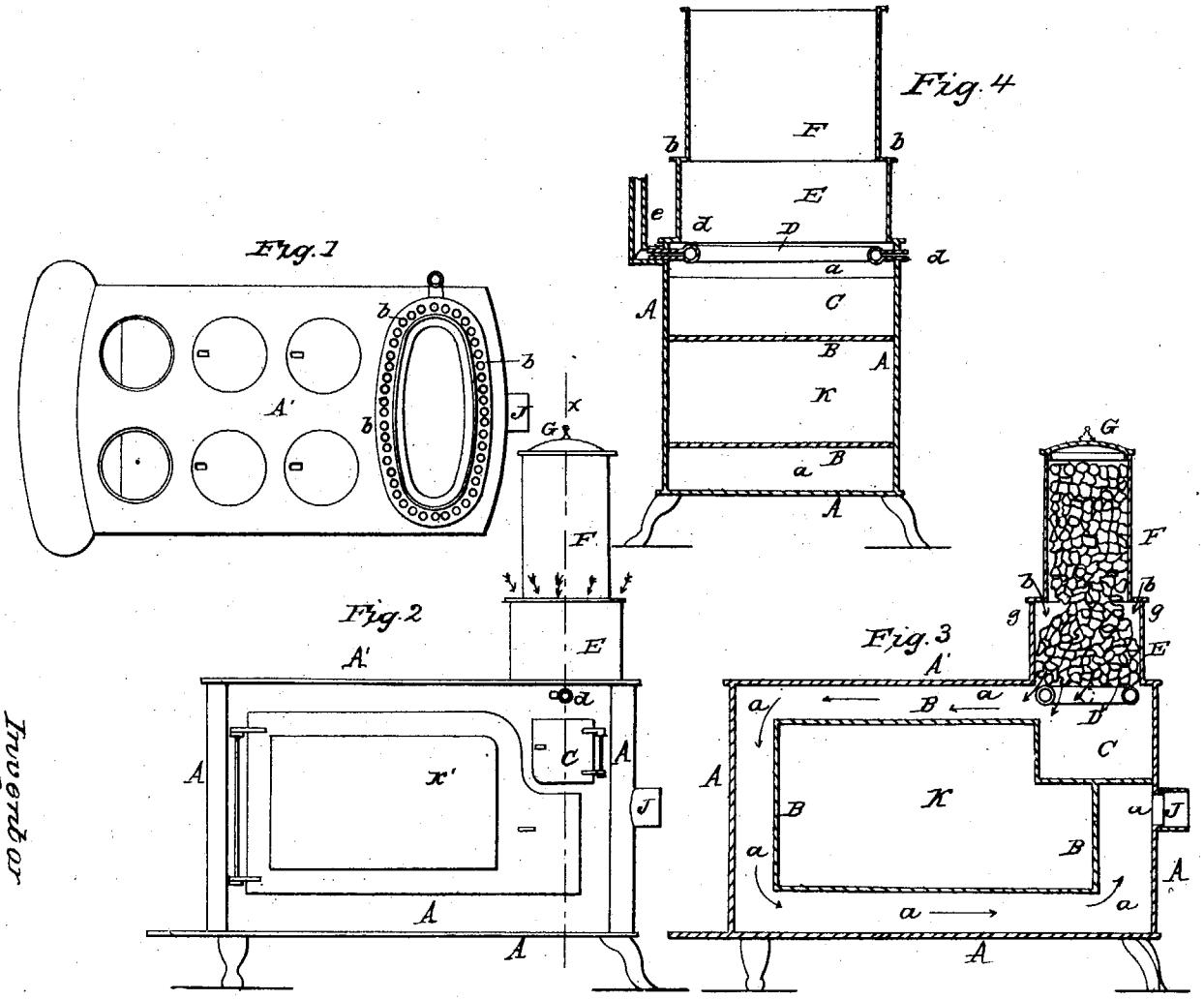
Witnesses
H. T. Campbell
Chas. Schaefer
Inventor
James Easterly
by Mason, Fenwick & Lawrence
N. PETERS, Photo-Lithographer, Washington, D. C.

United States Patent Office.

JAMES EASTERLY, OF ALBANY, NEW YORK.

*Letters Patent No.* 12,382, *dated February* 13, 1855; *reissue No.* 3,010, *dated June* 30, 1868.

DIVISION 2.

IMPROVEMENT IN BASE-BURNING STOVES.

The Schedule referred to in these Letters Patent and making part of the same.

TO ALL WHOM IT MAY CONCERN:

Be it known that I, JAMES EASTERLY, of Albany, in the county of Albany, and State of New York, have invented a new and improved Smoke-Consuming Cooking-Stove; and I do hereby declare that the following is a full, clear, and exact description of that part of my invention which relates to Division No. 2, reference being had to the accompanying drawings, making a part of this specification, in which—

Figure 1 is a top view of the improved cooking-stove.

Figure 2 is a side elevation of the same.

Figure 3 is a longitudinal section, taken vertically through the centre of the stove.

Figure 4 is a transverse section through the stove, taken in the vertical plane indicated by red line *x x* in fig. 2.

Similar letters of reference indicate corresponding parts in the several figures.

The object of my invention is to construct a cooking-stove with a coal-supply magazine, arranged over a combustion-chamber, having one or more inlets for air at some point or points above the grate, so that the gases evolved from the coal, and the air mixed therewith, will descend through the bed of incandescent coals, and thereby effect a very perfect combustion and utilization of gaseous products, as will be hereinafter described.

Another object of my invention is to combine a coal-supply magazine and a combustion-chamber with a cooking-stove, in such manner that the heated products of combustion shall be caused to descend through the bed of burning coals, and thence circulate about the walls of the oven before escaping from the stove, as will be hereinafter described.

To enable others skilled in the art to understand my invention, I will describe its construction and operation.

In the accompanying drawings, A A′ represent the outer walls of a cooking-stove, which may be made of any suitable form, and B B represent inner walls, which enclose the oven K, and form a flue, *a*, extending from an ash-pit, C, around the oven to an escape-pipe, J, as shown in fig. 3. The escape-pipe J is arranged directly below the ash-pit C, and at the same end of the stove as this ash-pit, so that the heated products of combustion shall circulate entirely around the oven K in the flue-space *a*, before being allowed to escape, as indicated by the red arrows in fig. 3.

Directly over the ash-pit, and extending above the top plate A′ of the stove, is a chamber, E, which is the combustion-chamber, and which may be made of an elliptical or other shape in horizontal section. This combustion-chamber is provided at its base with a grate, D, which may be made hollow, as represented, so that cool air or water may be caused to pass through it for preventing it from rapidly burning out.

This grate *d* is supported at its ends by hollow trunnions *d d*, passing through the side plates of the stove, so that when desired, the grate can be oscillated or tilted for cleaning the combustion-chamber.

Above this combustion-chamber is a coal-magazine, F, which is of less horizontal area than the said chamber, and which is provided at its upper end with a tightly-fitting cover, G.

The ring *g*, which forms that part of the top of the combustion-chamber lying between its outer wall and that of the magazine, is pierced with openings, *b*, for the admittance of air into the combustion-chamber, above the bed of coals lying upon the grate D. This ring, *g*, may be provided with a suitable register for regulating the influx of air to the combustion-chamber.

In fig. 2, C′ represents a door leading into the ash-pit, and K′ represents a door leading into the oven K.

The operation of the stove is as follows: The fire being kindled upon the grate in the combustion-chamber E, the draught of air enters at *b b*, and passes downward through the grate D into the ash-pit C, thence over and around the oven K, as indicated by the course of the arrows in fig. 3, and finally escapes through the pipe J.

The magazine F being filled with coal, and the cover G closed tightly, the lower portion of the fuel descends upon the burning mass in the combustion-chamber, and becomes warmed by the heat of this mass. This heats the coal and distills from it the sulphur, bitumen, &c., which, with their gases, pass down through the fire and become consumed, leaving the coal converted into coke, to supply the waste of the burnt fuel. The draught of air being admitted at *b b*, the coal, which is stored above its line, does not ignite, but is simply warmed and prepared for ignition as it descends into the combustion-chamber.

I do not claim broadly the application of a coal-supply magazine to cooking-stoves, as such stoves have been made with coal-supply magazines, arranged partially or entirely within the outer walls of such stoves; and while I disclaim the broad principle of combining with a cooking-stove a fuel-supply magazine, I do not confine my invention to the particular form of cooking-stove herein shown, as the form and arrangement of the parts may be varied considerably without departing from the principle herein set forth.

Having described my invention, what I claim as new, and desire to secure by Letters Patent, is—

1. A cooking-stove, which is provided with a coal-supply magazine and a combustion-chamber, arranged without the space enclosed by the outer walls of the stove, substantially as described.

2. The combination of a coal-supply magazine with a cooking-stove, when such magazine is wholly outside of the outer walls of the stove, substantially as described.

3. In a cooking-stove, having a magazine for supplying the combustion-chamber with fuel, I claim inlets for the admission of air to the burning fuel, arranged at some point or points above the grate, substantially as described.

4. The relative arrangement of the several parts of the stove, whereby the heated products are caused to circulate around the oven, substantially as described.

Witnesses:

H. G. Ten Eyck,

L. McInerny.

JAMES EASTERLY.